Jan. 10, 1956  J. N. DAVIS  2,730,696

PULSE TIME MODULATED SYSTEM

Filed May 10, 1951  5 Sheets-Sheet 1

INVENTOR
JAMES N. DAVIS
BY
Paul S. Martin
ATTORNEY

INVENTOR
JAMES N. DAVIS
BY Paul S. Martin
ATTORNEY

United States Patent Office 2,730,696
Patented Jan. 10, 1956

2,730,696

PULSE TIME MODULATED SYSTEM

James N. Davis, Falls Church, Va., assignor to Sylvania Electric Products Inc., a corporation of Massachusetts Application May 10, 1951, Serial No. 225,534

11 Claims. (Cl. 340—182)

This invention relates to improvements in methods and apparatus for communication, and, more particularly to pulse modulated telemetering systems of the type wherein intelligence is transmitted from a signal initiating device to a signal receiving device by means of a pulse modulated carrier wave.

A primary object of the invention resides in the provision of an improved method for the conveyance of data by means of a pulse time modulated carrier wave. This is effected in the illustrative example in a manner wherein a plurality of simultaneously varying items may be simultaneously via the same carrier rather than sequentially transmitted. It is known in the art to transmit a sequence of variable quantities with a time relation therebetween or between each variable and a reference indicative of intellectual data; but such values have heretofore been sequentially associated in a manner whereby a failure, either in the initiation or transmission of any one variable, results in a total breakdown of the system. With this limitation in mind, the present invention provides for the simultaneous transmission of information over a plurality of channels which are cooperatively related in a manner to permit simultaneous recording of the data carried by each channel but with each channel operating independently of the others to avoid, upon failure of any one channel, a resultant termination of operation of the other channels.

Another important object is to improve the method of transmitting and receiving the electrical representations of intelligence to permit a higher sampling rate than heretofore obtained, thereby improving both the reading speed and the reading accuracy, while reducing the possibility of errors due to circuit transients and non-linearity of sweep, which introduce increasingly larger error percentages with increasing sampling rate of the known sequential systems.

A further object is to provide an improved means for the simultaneous triggering of multiple measuring channels.

Another object is to provide improved locking means between data transmitting and remote positioned data receiving equipment.

Still another object is to provide an improved method for the simultaneous transmission of intelligence conveying pulses from a plurality of measuring channels in a manner whereby the pulses emanating from each channel may be readily distinguished, each from the other. In one aspect of the invention this is accomplished through width variations or other characteristic when displayed on a cathode ray tube or comparable indicating device.

A still further object of the invention resides in the improvement in a method of recording a plurality of simultaneously received intelligence conveying pulse time modulated signals.

Another object is to provide, in connection with the methods above mentioned, an improved method for introducing time intervals and of recording said time intervals with said data.

A further broad object is to provide improved equipment, of both transmitting and receiving types, to permit the efficient practice of the improved methods.

Another object is generally to improve and simplify multi-channel pulse time modulated methods of communication and equipment for one or more of the purposes above enumerated.

In the drawing, in which like parts are identified by the same reference numerals:

While the principles employed in the present invention are susceptible to rather wide application they will be shown and described herein as applied to equipment comprising a transmitter, adapted to be airborne, and to convey to a remotely located receiver a plurality of intelligence conveying signals, initiated in response to variations in end instruments associated with the airborne equipment for measuring temperature, pressure and the like in a manner where by electrical representations of data from each end instrument is initiated in separate channels in the form of a time modulated pulse signal, and subsequently modified and conveyed by a carrier wave from the airborne transmitter to a remote ground receiver, to be demodulated by said receiver with the intelligence from each channel permanently recorded at the receiving station.

As above mentioned, certain inherent limitations have restricted, to some extent, the use of pulse time modulated telemetric systems. Major limiting factors have been the isolation of receiving channels, heretofore believed necessary, with variations of intelligence data limited to each channel width, and enclosed by guard bands, and to the sequential relation mentioned. It is not possible to read all channels simultaneously in the device first mentioned. Simultaneous reading, obtained by the present invention, rather than sequential reading of the channels, permits a higher sampling rate, and greater reading accuracy.

Figure 1:
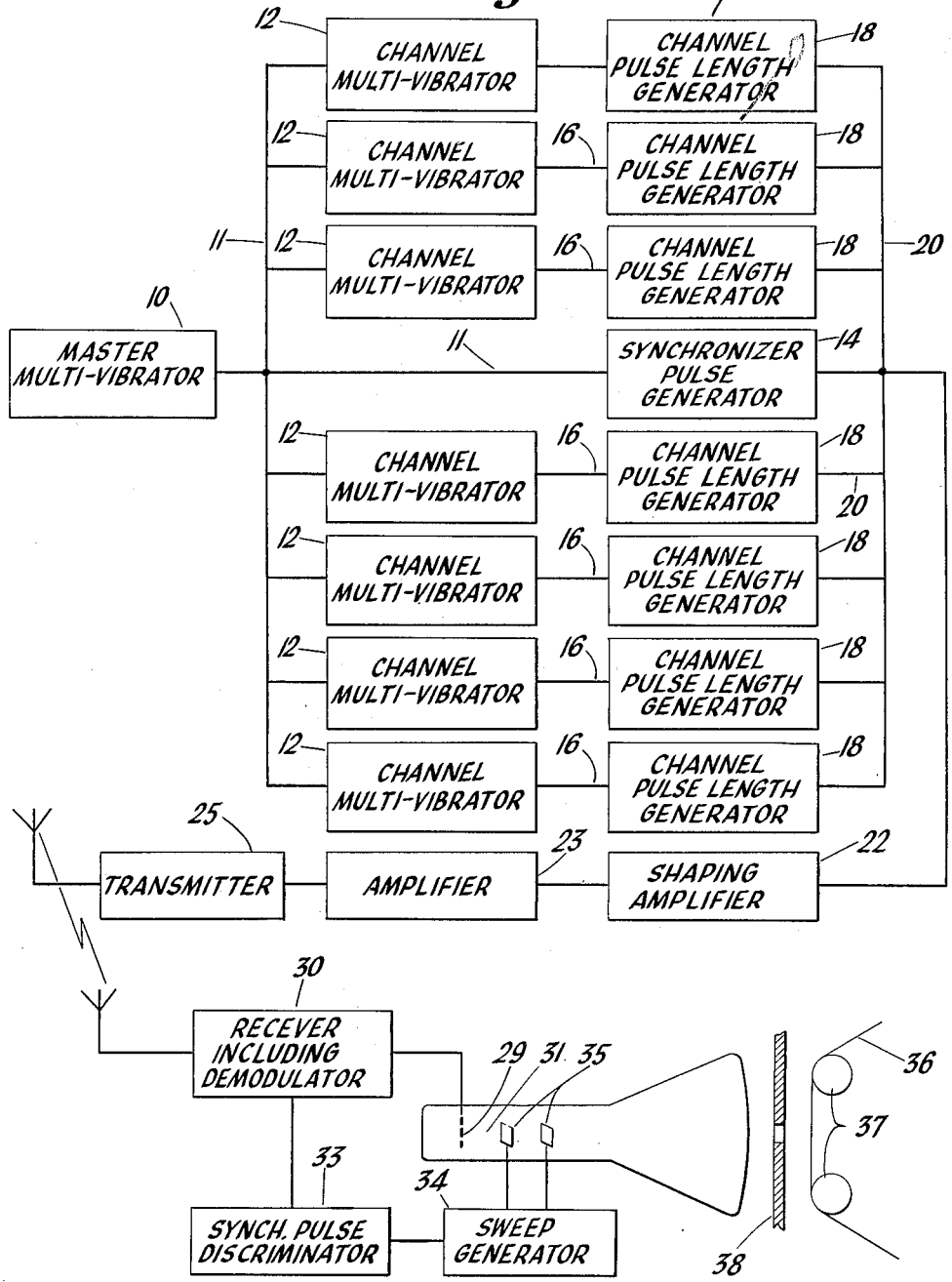
Figure 1 is a block diagram showing the general circuit arrangement of equipment having the inventive principles incorporated therein both at the transmitter and at the receiver.

Figure 1 illustrates in block diagram the major components of both the transmitting and receiving portions of the system. Referring to the transmitting portion thereof, the square wave output of a free running master multi-vibrator 10 is fed through conduits 11 to a plurality of channel multi-vibrators 12 and to a synchronizing pulse-length generator 14. The output of each channel multi-vibrator is fed, by conduit 16, to a like number of channel pulse-length generators 18, the outputs of which are connected by conduits 20 to merge with the output of the synchronizing pulse length generator 14 and to a shaping amplifier 22 which in turn feeds into a transmitter 25 for modulations thereof, a detailed explanation of the various components above described being given below in reference to the schematic diagram of Figure 2. Briefly, however, generator 14 emits a synchronizing pulse that is short compared to the period of the master multi-vibrator; while generators 18 emit still shorter pulses at various times after each synchronizing pulse in accordance with the data to be transmitted, and, further, the pulse emitted by each generator 18 is of constant duration or width which is different from the respective widths of all the other channels so as to identify the various channels.

Components of the receiving end of the system, also illustrated in block diagram, include a modified radar type receiver 30 the output of which leads to the intensity control grid 29 of a cathode ray tube 31, receiver 30 also being connected to a synchronizing pulse discriminator 33 for controlling sweep generator 34 associated in a conventional manner with the horizontal plates 35 of cathode ray tube 31. A strip of photographic film 36 is moved at a constant speed over rollers 37 in spaced relation to the face of tube 31, a horizontally slotted opaque mask 38 being preferably disposed intermediate film 36 and tube 31, to protect the film from spurious light rays.

Figure 2:
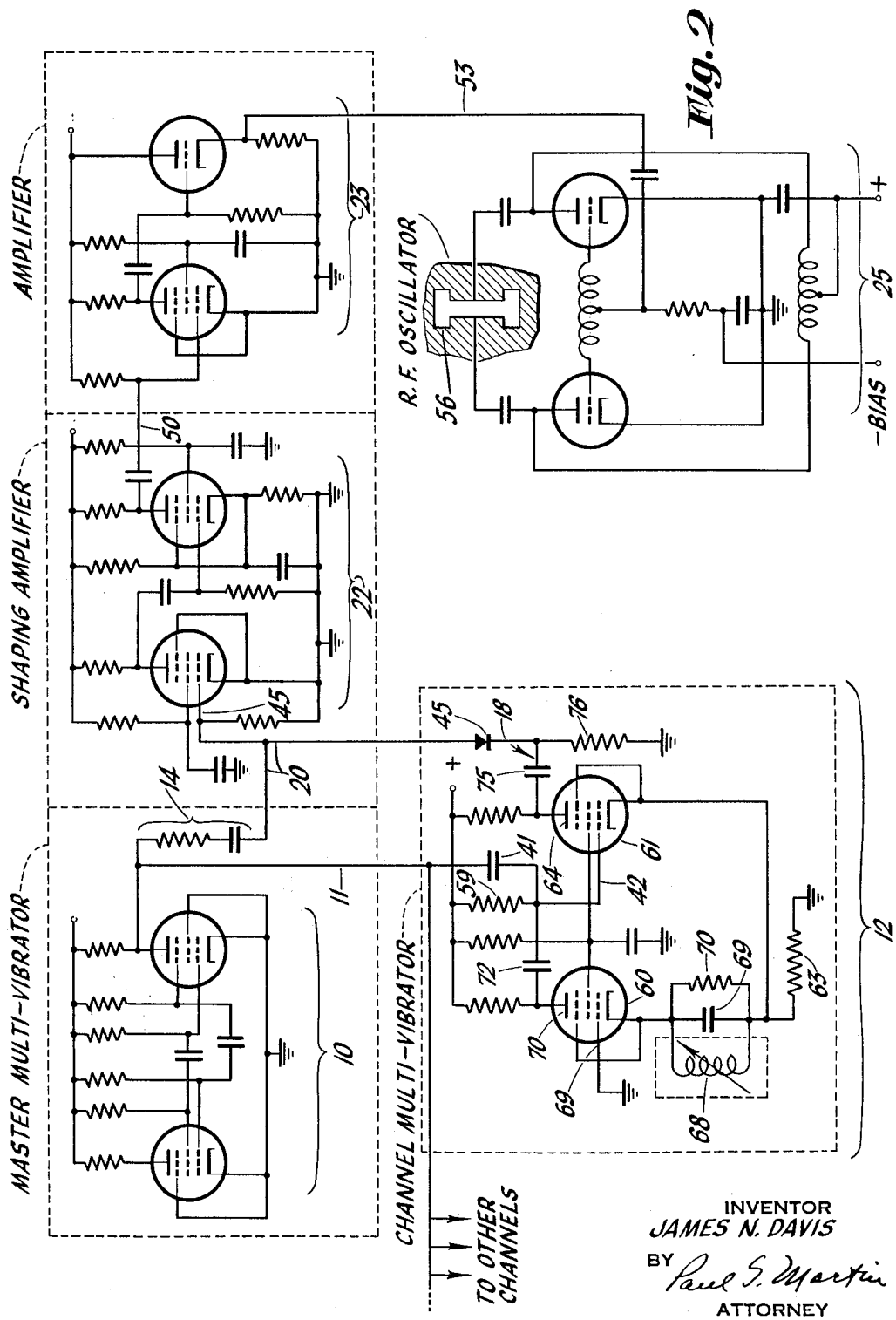
Figure 2 is a schematic diagram showing details of circuitry which might be used in the various component circuits, illustrated in block in the upper or transmitting end of the device as shown in Figure 1.

With reference to the schematic diagram, Figure 2, master multi-vibrator 10 is of the conventional free-running type with the circuit constants chosen to permit operation at two kilocycles, the sampling rate of the system. The square wave output therefrom is led by conduit 11 to capacitor 41 and control grid 42 of each of the plurality of channel multi-vibrators 12, only one of which is illustrated for the purpose of simplifying the description; and through an RC network, generically designated 14, which serves (with effects of the associated circuit) as a generator of synchronizing pulses, through conduit 20 to the input grid 45 of the shaping amplifier 22. Each channel multi-vibrator 12 consists of a modified Eccles-Jordan circuit of the "one shot" multi-vibrator type, further modified to the extent that the control grid of the normally unstable tube, considered herein to be the normally non-conducting tube, is maintained at ground potential, with the cathode voltage being allowed to fluctuate as later described in detail, by ringing action of an inductance-containing circuit. The latter circuit is series connected with the cathode resistance, the inductance therein, which is variable, being operatively associated with an end measuring instrument for variation in response to the intelligence data output of the end instrument. Details of the operation of each of the channel multi-vibrators is discussed below, following a general description of the correlation between the various component circuits shown.

Figure 3:
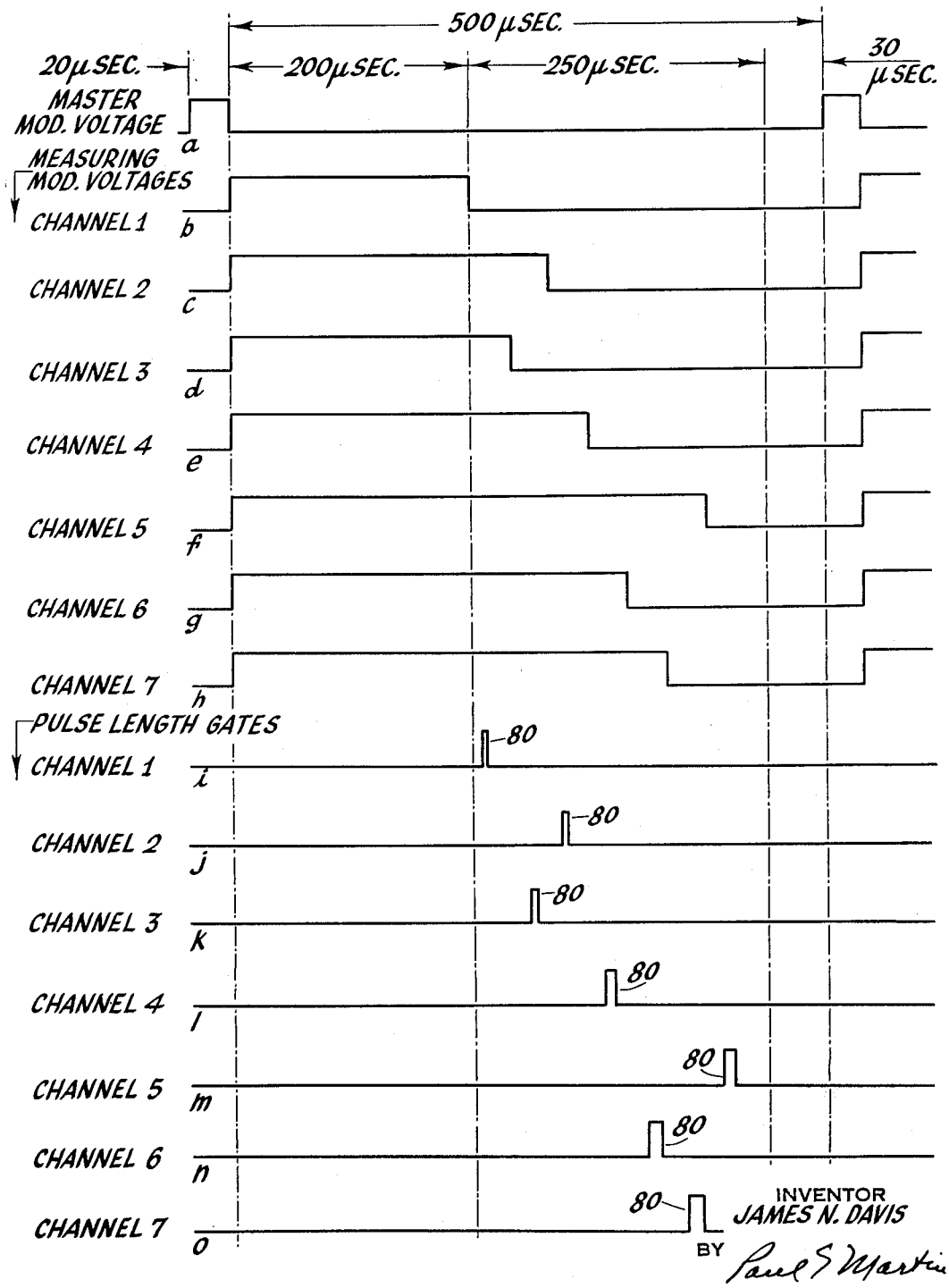
Figures 3 and 4 show operational curves which will be referred to in the description.

Each channel multi-vibrator 12 functions to produce a positive output pulse, shown in curves *b* through *h*, Figure 3, varying in width between 200 and 450 microseconds in dependence on the quantity to be transmitted. The trailing edges of these pulses are differentiated by circuit 18 to result in peaked pulses of constant widths, the pulse from each channel depending upon the R. C. constants of its circuit 18. The trailing edge of each square wave is thus controlled by a measurement instrument in a manner to permit simultaneous display and recording at the receiving end of the system. It is therefore sufficient to state for the present that the trailing edge of each output pulse from circuit 10, which is converted into a sharply peaked negative pulse by the R. C. constants of the circuits, is employed simultaneously to trigger each of the circuits 12 from a normally stable conducting condition to the unstable condition. The return thereof to the stable condition is controlled as to the time interval of such occurrence by the data indicating temperature, pressure, position, or output, of the respective end instruments. Further, the output pulse from each circuit 12 resulting from the return to the stable condition is differentiated by an R. C. circuit, generically designated 18 in Figure 2, and illustrated as channel pulse length generator 18 in Figure 1, to control, in conjunction with shaping amplifier circuit 22, to which it is fed, the characteristic pulse width of each said time positioned pulse. Provision of R. C. components of different values in each of the circuits 18 results in differentiated output pulses of variable slopes from the various channel circuits 12 which are shaped by circuit 22 into pulses of different widths to facilitate identification at the receiving end of the system, said differentiated output pulses from circuits 12 being clipped by crystal diodes 45 to eliminate positive peaks prior to being led to input grid 45 of shaping amplifier 22.

As heretofore mentioned, the output of master multi-vibrator 10 is also fed to grid 45 for shaping after pulse lengthening by R. C. circuit 14. Pulses from circuit 10 are fed to each of the channel circuits 12 without lengthening, since they do not pass through circuit 14. The time required for each of the channel circuits 12 to return, after triggering, to the stable condition is approximately 200 microseconds minimum as compared to a 20 microsecond time width of the lengthened synchronizing pulses from circuit 10. The channel pulses fall within a time interval starting 200 microseconds from the trailing edge of each synchronizing pulse, and are confined to fall in an interval ending 250 microseconds thereafter, with a guard period of 30 microseconds following said 250 microseconds. The total time period between each pulse from circuit 10, which controls the sampling rate of the system, is therefore 500 microseconds, automatically provided by the 2000 cycle rate of the master multi-vibrator. It is therefore seen that in the shaping amplifier there is no interference between the synchronizing pulses and any of the data channel pulses.

The output of shaping amplifier 22, comprising the above mentioned synchronizing pulses and the data conveying time modulated pulses from each of the channel circuits 12 is fed by conduit 50 to a conventional power amplifier 23, the output of which is cathode follower coupled by conduit 53 to R. F. oscillator 25 for modulation thereof. Transmitter 25, Figure 1, comprises the high frequency oscillator circuit, Figure 2, operating at a frequency, in the present example, at around 200 megacycles, for excitation of a resonant slotted antenna 56 which is described in further detail in copending application Serial No. 31,722, filed June 8, 1948, by N. L. Harvey.

The receiving equipment, as shown in block diagram, Figure 1, and above briefly described, is synchronously locked to the transmitter by the above mentioned 20 microsecond pulse from the output of master circuit 10 in the following manner. A synchronizing pulse discriminator 33, Figure 1, of known type, may be adjusted to pass only pulses of, for example, 16 to 24 microseconds, and since the data channel pulses vary between lower width limits, such as 2 to 8 microsecond widths, the sweep generator 34 is controlled or actuated only by the synchronizing pulse, and specifically by the trailing edge thereof. The synchronizing pulse generator has a multi-vibrator, not shown, associated therewith in a manner to actuate the sweep generator after a fixed time delay following reception of the synchronizing pulse, to prevent display of the synchronizing pulse on cathode ray tube 31.

Details of the pulse initiating and shaping circuits above described are as follows. The trailing edge of the square wave output pulse of the free running multi-vibrator circuit 10, as shown in Figure 3, curve *a*, is employed to control the sampling rate of the system, or from another view point, the frequency of the cathode ray tube sweep at the receiving end. As shown by curves *b* through *h*, the rise of the square wave output pulses of all channel circuits 12 is in time coincidence with the fall of the square wave output of master circuit 10, and since as above described, the fall of the master pulse also synchronizes the receiving equipment by initiating, in a known manner, a 200 microsecond delay period at the receiving end, after which the sweep generator starts, both transmitter and receiver are synchronously locked in a manner to derive intelligence by variation of the length of the square wave generated in each channel. As shown by comparison of Figure 3, *b* through *h* with Figure 3, *i* through *o*, the trailing edges of these square waves control the time interval between the reference standard pulse of curve *a* and the leading edges of the various data conveying time-modulated pulses of mutually different widths. The leading edges of curves *b* through *h*, Figure 3, represents the triggering of circuit 12 from a stable to an unstable condition, in response to the fall of the control or reference pulse from circuit 10, curve *a*, the length of each channel pulse being controlled as described below.

Considering the representative channel circuit of Figure 2, tube 60 is normally blocked and tube 61 normally conducting due to positive bias from current limiting resistor 59. The voltage at the top of cathode resistor 63, with tube 60 blocked, is held at a certain positive value by current flow from anode 64 through tube 61 and through the cathode resistor 63 to ground. A pulse is introduced from circuit 10 to grid 42 of tube 61, first being differentiated by circuit resistances and by capacitor 41 of small value, to result in a sharp negative peak. Grid 42 is thereby driven negative to turn tube 61 off, and the voltage across cathode resistor 63 drops sharply with a consequent lowering of cathode potential of tube 60. Since grid 66 of tube 60 is grounded, reduction of cathode potential lowers the relative negative grid potential to above cut-off and tube 60 starts to conduct. The resulting change in plate current flow in tube 60 holds grid 42 of tube 61 negative after termination of the negative triggering pulse from circuit 10, since as tube 60 begins to conduct, the voltage at anode 70 decreases, the decrease passing through capacitor 74 to appear as a negative going voltage on the grid 42 of tube 61.

In Figure 6*a*, the solid line represents the grid voltage curve of tube 69, assuming the circuit between resistor 63 and cathode eliminated. The cathode is normally maintained above cut-off at *a*, but dipping sharply at *b* to a value below cut-off, to return as shown by exponential curve *c* past the cut-off point *d* to reassume a steady value *e* corresponding to the original value *a*. The operation of each channel circuit 12 as above described does not take into consideration the manner in which intelligence is introduced to the cathode circuit of tube 60 to vary the time duration for return of each circuit to the stable condition subsequent to being triggered. As is well known, R. C. components are normally selected in circuits of this type to give a desired cyclic rate, such constants being of fixed value. Each of the present channel control circuits 12 has been modified in the following advantageous manner, or by some alternate manner, to permit variation of rate controlling constants in response to variations in the output values of associated instruments, not shown, it being understood that the end instruments are cooperatively associated with one or more devices capable of being varied in value in response to intelligence conveying variations of said instruments.

The end instrument circuit interposed between resistor 63 and cathode of tube 60 includes a variable inductance 68, connected in parallel with a fixed capacitor 69 and a fixed resistor 70; the parallel circuit being series connected between the cathode of tube 60 and the cathode resistor 63. While the invention is not limited to the employment of a variable inductance in a one-shot multi-vibrator and in other aspects extends to other time-modulated square-wave generators, certain advantages have been found to reside in the employment, at least for the intended use of the present device, of the electrical properties of the foregoing cathode circuit known as ringing action, in the manner described below.

Figure 6:
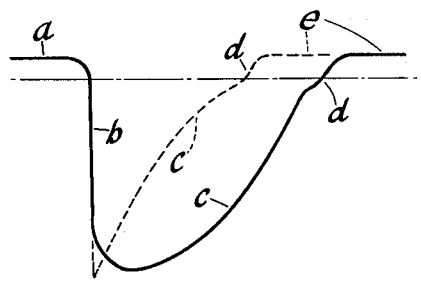
Figure 6 shows comparative grid curves to be explained in the description of data pulse initiation.

The normal shape of the grid curve, as shown dotted lines, in Figure 6, is solely dependent, with grid 66 grounded, upon potential changes in the cathode circuit of tube 60. Hence a modification of that curve to vary the time interval for return of tube 60 to the stable conducting condition will vary the position of each resulting differentiated intelligence conveying pulse within the 250 microsecond interval above mentioned. It is the function of said end instrument circuit to vary the grid curve in a manner to time modulate the channel circuit pulses resulting from a return of the multi-vibrators to the stable condition. Since the property of inductance to retard current changes in any circuit is well-known, and since it is apparent that with tube 60 conducting, cathode current flows to ground through parallel connected inductance 68 and resistor 70, changes in the value of L, which effect the circulatory current flow within said parallel circuit will, in effect, alter the total value of the cathode resistance of tube 60, thereby modifying the dotted-line grid voltage wave shape of Figure 6 for example, to the shape shown in the solid line. While the specific construction of the variable inductance employed forms no part of the present invention, a coil associated with a thin metal disc, spaced from a core of high permeability material, and actuated by pressure or mechanical connection to the end instrument, has proved satisfactory in use.

Figure 7:
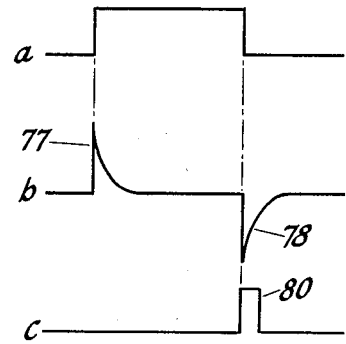
Figure 7 shows several curves illustrative of the pulse forming circuits to be described in connection with the circuitry of Figure 2.

The square-wave output signals from each channel pulse 12 as shown in Figure 7*a*, representing the shift of tube 61 to cut-off and back to full conduction, is differentiated by circuits 18, each comprising a capacitor 75 and a resistor 76, to produce a wave shape shown in Figure 7–*b*, of varying widths to emerge as square-wave pulses from the shaper circuit 22, of from 2 to 8 micro-seconds duration. The positive peaks 77 of the differentiated pulses are suppressed by diode 45, while the negative peaks 78 pass to the control grid of shaping amplifier 22 and appear as square waves 80, Figure 7–*c*, in the output thereof. Since the values of capacitor 75 and resistor 76 govern the slope of the peaked pulses resulting from differentiation, the shaping amplifier, adjusted to clip at a predetermined height, produces square-wave pulses, the widths of which correspond to the widths of the differentiated pulses fed to that amplifier. Selection of those pulses, of different RC values in the differentiating circuits of each channel circuit 12, as above stated, thus results in square-wave time modulated pulses each having channel identifying characteristic widths, for further amplification by circuit 23 Figure 1, and employed to modulate R. F. oscillator.

Since the shaping amplifier shapes all channel initiated pulses, as well as the synchronizing pulse from circuit 12, some means for preventing cross talk was found necessary, and in this respect crystal diodes 45 serve the duo-function of isolating the channel circuits to effectively eliminate cross talk, while eliminating positive peaks of the differentiated output pulses. As above mentioned, the minimum time required for any one channel circuit 12 to swing to the unstable condition and return is 200 microseconds (Figure 4*a*) with data pulses 80 disposed at various time intervals, within the 250 microsecond interval following the minimum 200 microsecond period, a guard period of 30 microseconds being shown following the 250 microsecond period. Transmitter-receiver synchronization is obtained by the receiver initiated pulses 81 (Figure 4–*b*) which are narrower than the synchronizing pulses 82 with which they lock, but have their trailing edges in time coincidence therewith.

Figure 4:
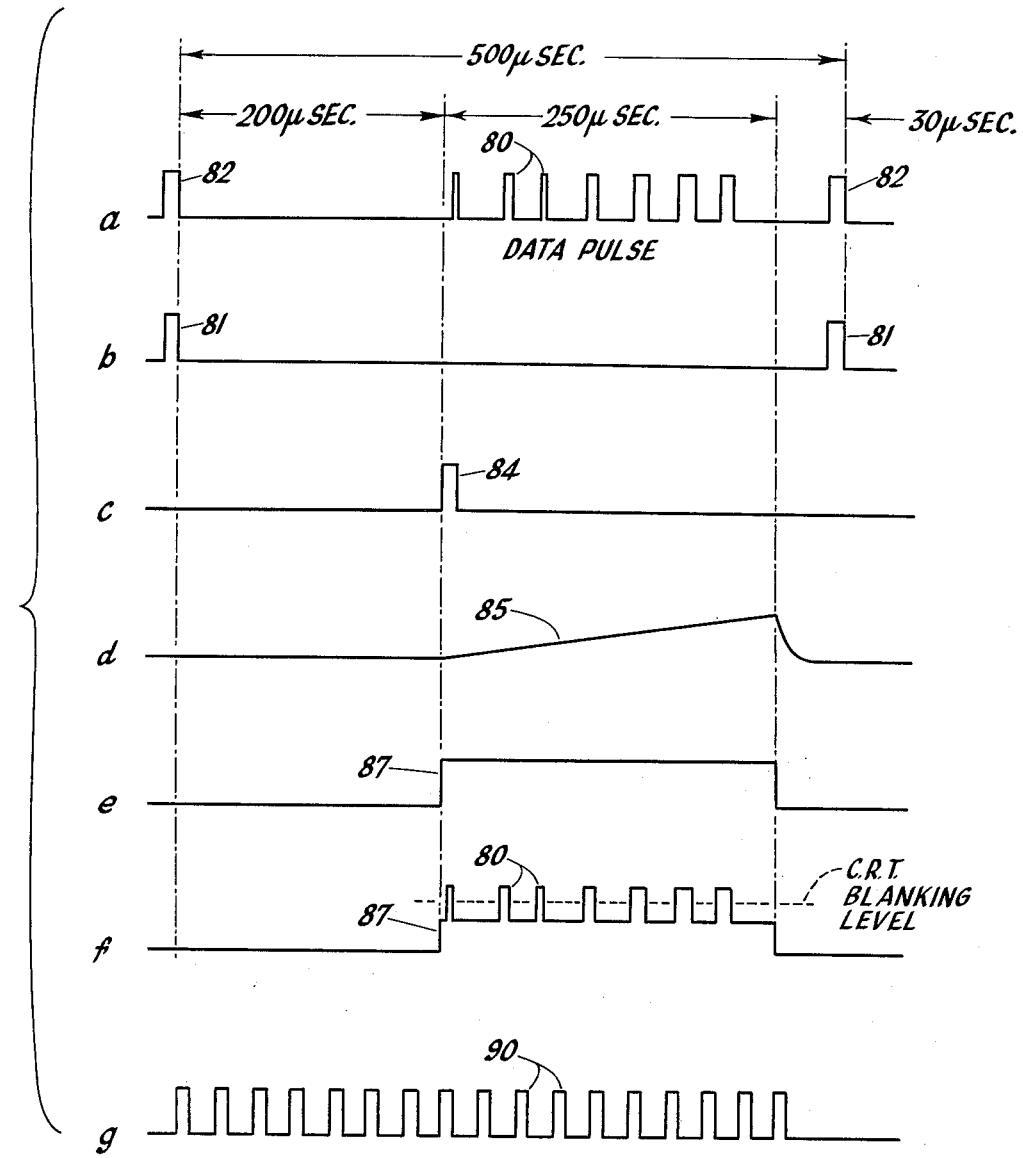

Since the data presentation is to be made on a recording cathode ray tube, and since no pulses will ever appear during the first 200 microseconds following a synchronizing pulse, that time interval need not be presented on the tube. A delay trigger circuit in the receiver, not shown, provides a sweep trigger pulse 84, 200 microseconds after the trailing edge of the synchronizing pulse, as shown in Figure 4–*c*. Trigger pulse 84 initiates a 250 microsecond sweep voltage, and a composite signal, made up of the received video signals 80, Figure 4–*a*, and the pedestal 87, Figure 4–*c*, as illustrated by Figure 4–*f*, is fed to the intensity-control grid 29 of the cathode ray tube 31, Figure 1.

When desired, sweep calibration time markers, referred to the trailing edge of the synchronizing pulse, can momentarily be added to the signal on the intensification grid 29. Markers spaced, for example, 20 microseconds apart, and 2 microseconds wide, as shown at 90, Figure 4–g and as dots 90 on film 36, Figure 5, are applied to the intensity control grid circuit in a known manner.

Figure 5:
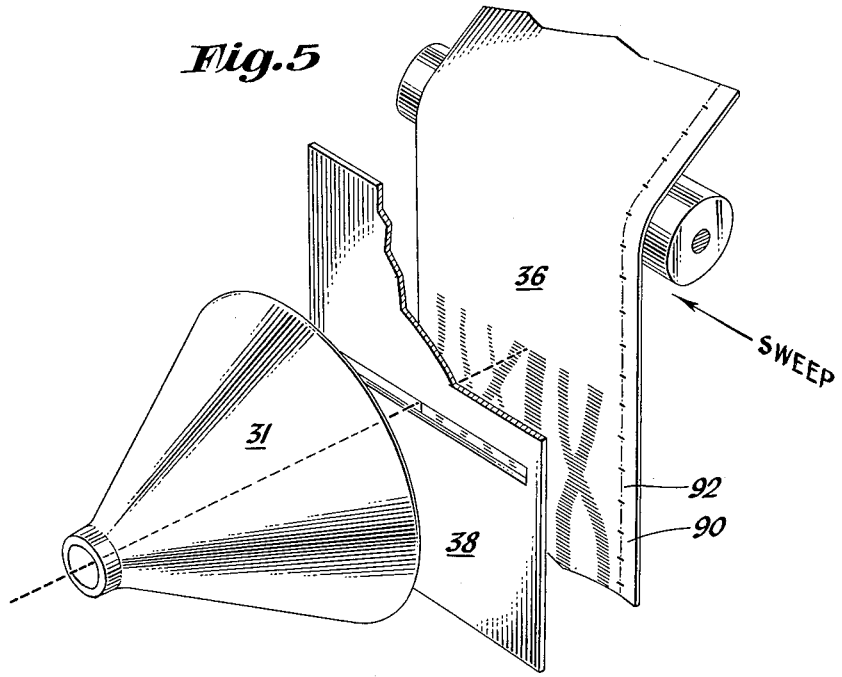
Figure 5 illustrates details of the recording equipment associated with the receiver, and also shown in Figure 1.

The illustration of the photographic film record, shown in Figure 5 shows a probable interlacing of data pulse lines, exaggerated as to spacing between successive dots in each channel, since the film record resembles, in practice, continuous lines of different widths, and different exposures. They vary sufficiently, however, to be readily distinguishable. It is understood that a time reference line, such as 92, Figure 5, on the edge of the film may be used to provide a base reference for reading relative recorded values, represented by the transverse distance of each channel pulse trace therefrom. While the above description has referred to a system employing seven data channels, the actual number may be varied as desired, since a master multi-vibrator has been employed simultaneously to trigger ten or more channels, and it may be desirable to vary the return of some multi-vibrators to the conducting condition by means other than that shown, for example by an accelerometer. It becomes evident, from an examination of the recording end of the system, that as the sampling rate is increased, the reading speed and accuracy increases, since the film may be run at correspondingly higher speeds with each data channel output still appearing as a continuous line. With seven channels as shown, the reading accuracy is greatly increased over the sequential system, because channel pulse excursions are limited only by the 250 microsecond interval as projected on to the film, whereas in the sequential systems such excursions are confined to the much narrower width of individual channels. The ratio of reading accuracy improvement is proportional to the difference in widths of the graphical record traced by each channel initiated pulse, between the single channel of the present device, and each individual channel of the sequential system. An added advantage is gained, in that a failure, at the transmitting end, of any one channel does not affect data transmission from the remaining channels.

Many other adaptions and modifications will become apparent to persons skilled in the art, without departure from the scope of the invention above described, as defined by the appended claims.

What is claimed is:

1. A pulse time modulator circuit having in combination, means for periodically initiating a synchronizing and time reference pulse, the interval between any two adjacent time reference and synchronizing pulses being defined as a transmission interval, said interval being composed of first and second successive sub-intervals, said second interval being characterized as a common interval means for initiating a plurality of data conveying pulses effective during a common interval, individual means associated with each of said last mentioned means for indicating intelligence to be conveyed by said data pulses, means operatively associating said first mentioned means and said second mentioned means to establish a common time base correlation therebetween, and means cooperatively connecting said first mentioned means and said intelligence indicating means with said second mentioned means for time interval spacing of pulses from said data initiating means in respect to pulses from said first mentioned means, said time spacing being controlled solely by said intelligence indicating means.

2. The device of claim 1, including means for the initiation of a carrier-wave, and means for modulating said carrier-wave by said time spaced data pulses and by said time reference and synchronizing pulses.

3. The device of claim 1 including means for initiating a carrier-wave, means for modulating said wave with pulses from said first and second mentioned means, means for receiving and demodulating said carrier wave, and means associated with said demodulating means for visually displaying the time interval position of each said data pulse.

4. In a device of the character described, a free-running multi-vibrator, a plurality of blocked multi-vibrators operatively associated with said free-running multi-vibrator to be simultaneously unblocked by output pulses therefrom, the period between successive output pulses being defined as a transmission interval, said interval being composed of first and secoid successive sub-intervals, said second interval being characterized as a common interval, means for the control of the return of said normally blocked multi-vibrators to a blocked condition, said blocked multi-vibrators and said control means therefore being related to restore the blocked multi-vibrators to blocked condition at any moment during a common time interval, heterogeneous means associated with each normally blocked multi-vibrator for differentiating pulses initiated in the anode circuit of said normally blocked multi-vibrators resulting from said return to the blocked condition, a common output channel, and rectifier means, interposed between said respective differentiating means and said common output channel for the prevention of cross talk between said shaping means, said plural blocked multi-vibrators, and said free-running multi-vibrator.

5. In combination, a source of equidistantly spaced timing pulses, the interval between any two adjacent timing pulses being defined as a transmission interval; a plurality of pulse generators coupled to said source, each generator during said interval producing an information carrying pulse capable of being positioned in any position intermediate the two timing pulses defining said interval, the information pulse produced by each generator having a different constant width; and means to supply a different variable control signal to each generator to determine the position of the corresponding information pulse within said interval in accordance with the variations of the corresponding control signal.

6. The combination as set forth in claim 5 wherein the transmission interval is divided into first and second consecutive sub-intervals and wherein all of said information pulses are produced during said second sub-interval.

7. The combination as set forth in claim 5 wherein said control signal supply means includes a like plurality of mechanical-electrical transducers, there being one transducer associated with each generator.

8. In combination, a source of equidistantly spaced timing pulses, the interval between any two adjacent timing pulses being defined as a transmission interval; a plurality of pulse generators coupled to said source, each generator during said interval producing an information carrying pulse capable of being positioned in any position intermediate the two timing pulses defining said interval, the information pulse produced by each generator having a different constant width; means to supply a different variable control signal to each generator to determine the position of the corresponding information pulse within said interval in accordance with the variations of the corresponding control signal; means coupled to said source and said generators to combine the timing and information pulses into a common output signal, means for producing a carrier wave; and means to modulate said carrier wave with said output signal.

9. The combination as set forth in claim 8 further including means for demodulating the modulated carrier wave to reproduce the output signal; and apparatus for displaying said output signal, said apparatus including a cathode ray tube, means responsive to the timing pulses contained in the output signal to control the beam sweep of the tube; and means responsive to the information pulses contained in the output signal to intensity modulate the beam of said tube for visual indication of the information communicated by said information pulses.

10. The combination as set forth in claim 8 further including means for demodulating the modulated carrier wave to reproduce the output signal; and apparatus for permanently recording the information conveyed by said output signal, said apparatus including a cathode ray tube, means responsive to the timing pulses contained within the output signal to control the beam sweep of said tube, means responsive to the information pulses received during each sweep, and means for photographically recording, on a moving film, individual graphs indicative of the information carried by the information pulses.

11. In combination, a source of equidistantly spaced timing pulses, the interval between any two adjacent timing pulses being defined as a transmission interval; a plurality of pulse generators coupled to said source, each generator during said interval producing an information carrying pulse capable of being positioned in any position intermediate the two timing pulses defining said interval, and means to supply a different variable control signal to each generator to determine the position of the corresponding information pulse within said interval in accordance with the variations of the corresponding control signal.

References Cited in the file of this patent

UNITED STATES PATENTS

| | | |
|---|---|---|
| 2,468,703 | Hammel | Apr. 26, 1949 |
| 2,489,253 | Andre | Nov. 29, 1949 |
| 2,525,893 | Gloess | Oct. 17, 1950 |
| 2,553,752 | De Lange | May 22, 1951 |
| 2,554,308 | Miller | May 22, 1951 |
| 2,648,836 | Newby et al. | Aug. 11, 1953 |

FOREIGN PATENTS

| | | |
|---|---|---|
| 528,806 | Great Britain | Nov. 7, 1950 |

OTHER REFERENCES

Publication "Electronics," March 1947, pages 101–105